(No Model.)
J. H. & P. LUX.
HAY ELEVATOR AND CARRIER.
No. 260,697. Patented July 4, 1882.
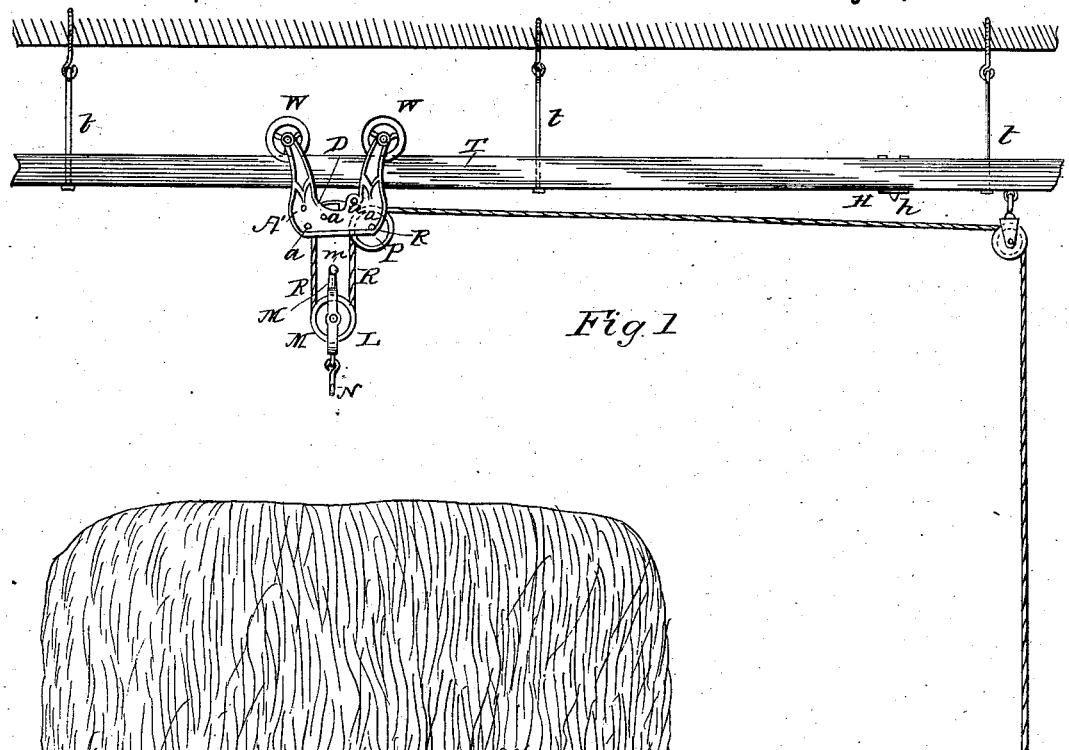
Fig. 1.
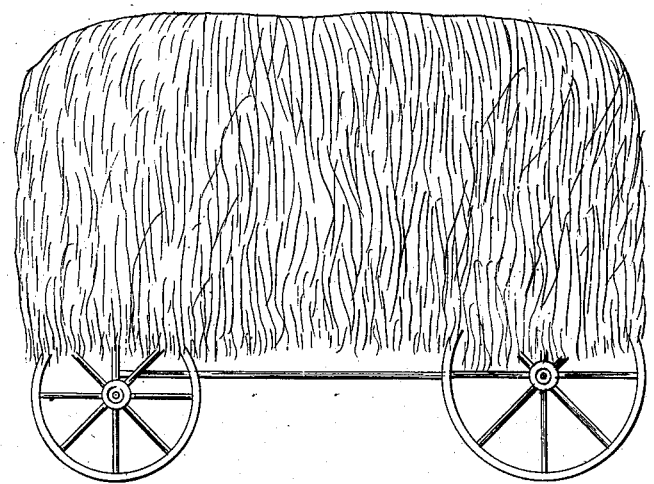
Fig. 5.
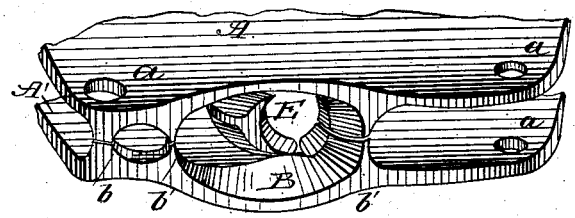
WITNESSES:
Fred. G. Dieterich
John G. Hinkel
John H. Lux
Philip Lux
INVENTORS,
by Louis Bagger & Co.
ATTORNEYS.

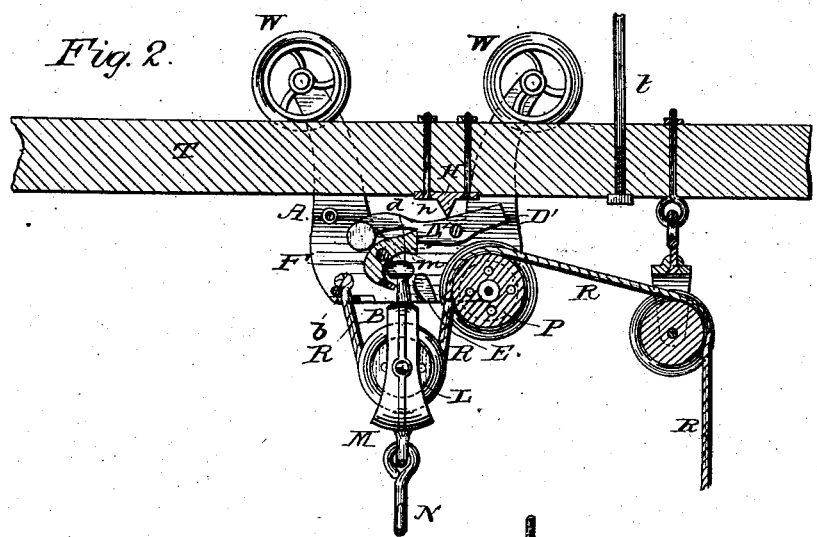
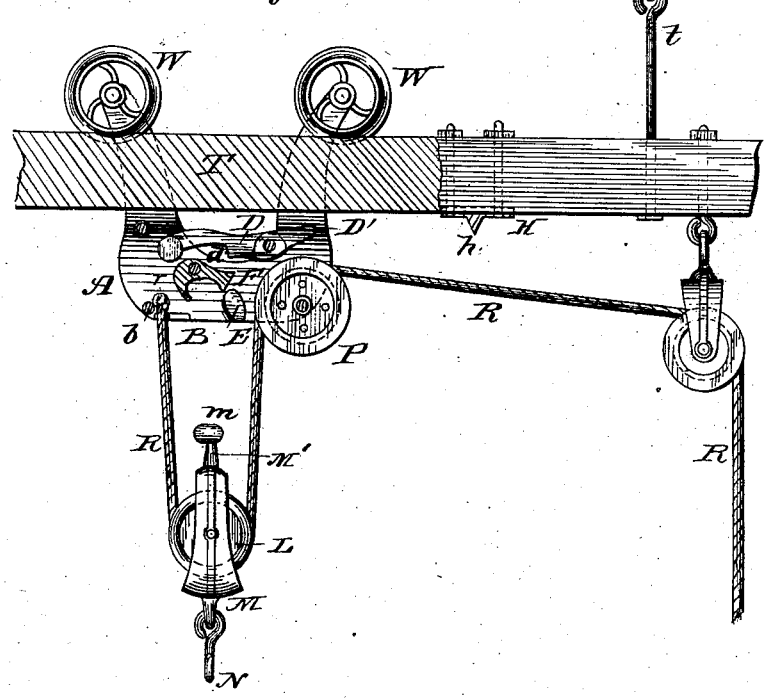
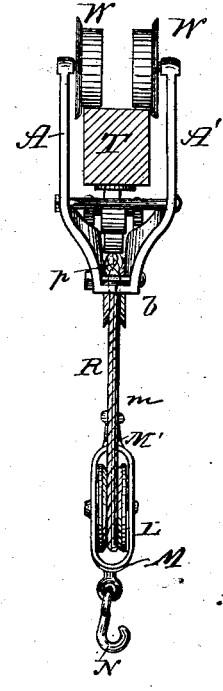

UNITED STATES PATENT OFFICE.

JOHN H. LUX AND PHILIP LUX, OF EARLVILLE, IOWA.

HAY ELEVATOR AND CARRIER.

SPECIFICATION forming part of Letters Patent No. 260,697, dated July 4, 1882.

Application filed May 15, 1882. (No model.)

*To all whom it may concern:*

Be it known that we, JOHN H. LUX and PHILIP LUX, of Earlville, in the county of Delaware and State of Iowa, have invented certain new and useful Improvements in Hay Elevators and Carriers; and we do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of our improved hay elevator and carrier, showing the fork-sheave in position above the loaded wagon and before interlocking with the car or carriage. Fig. 2 is a sectional side elevation, showing the interior construction and arrangement of parts of the carriage after the fork-sheave has reached and interlocked with it, and it is ready to start off on the track. Fig. 3 is a similar view, showing the carriage in its position after it has passed the triangular latch-block H and is in position to receive and interlock with the fork-sheave suspended below the carriage. Fig. 4 is an end view of the carriage, and Fig. 5 is a perspective view of its under side.

Similar letters of reference indicate corresponding parts in all the figures.

Our invention relates to that class of hay elevators and carriers in which the sheave or pulley carrying the hay-fork will, after it reaches the carrier or carriage, interlock with the same, so as to be suspended from it, while at the same time and by the same operation the carriage is released from the stop-block which holds it fixedly in position upon the track-beam, and is thus permitted to travel with its suspended load of hay along the track.

Our improvement consists in a simplified construction and combination of the parts constituting the latch or lock mechanism, and in adapting the carriage to be used on both sides or ends of the track, so that it may be changed from one mow to the other without change of any of its component parts, substantially as hereinafter more fully described, and particularly pointed out in the claims.

In the accompanying two sheets of drawings, T represents the track-beam, which is suspended from the rafters of a barn or other building by hangers $t$. The car or carriage is composed of two castings, A and A', which are exactly alike and united by bolts $a$. At each end of the carriage is a pair of flanged wheels, W W, the wheels of each pair being set such a distance apart that they will readily clear the hangers or suspension-bolts $t$, which pass through the center of the track-beam and are nutted to the under side of the same.

Each of the side pieces A and A', which constitute the carriage, is cast with an inwardly-projecting lug, $b$, a concavity, $b'$, and a wedge-shaped stud or projection, E. When the two parts A and A' are put together (see Fig. 5 of the drawings) the lugs $b$ $b$ will meet to form a circular opening, through which one end of the hoisting-rope R is inserted and held in place by forming a knot, $r$, on the inside, while the concavities $b'$ $b'$ will meet to form a bell-shaped mouth, B, separated from the pulley P by the transverse wall formed by the studs or shoulders E E.

The carriage A A' is provided with a cup or bell shaped catch, F, which has its fulcrum upon one of the bolts $a$, which connects the sides A and A'. Above this catch is pivoted, at $a'$, a lever, the weighted long arm D of which extends over or across the cup-shaped catch F, while its short arm D' is turned in an upward direction up against the under side of the track-beam. The long arm D has a shoulder or offset, $d$, as shown.

L is the hoisting-pulley or fork-pulley, which is hung in a frame, M, cast in one piece with a shank, M', that terminates in a rigid ball, $m$. To an eye in the lower end of frame M is attached a hook, N, which carries the hay-fork. The hoisting and drawing rope R, it will be seen, passes from its fixed point or terminus $b$ under the sheave or pulley L, up over the carriage-pulley P, through a sheave at the end of the track-beam, and down to the ground, where a horse is hitched to its free end.

At the point upon the track-beam underneath which the loaded wagons are placed is bolted a latch-block, H, of triangular shape, terminating in a wedge-point, $h$. This completes the operating parts, and the operation of the device is as follows:

As the carriage travels along the track-beam to receive a load block H will, as it passes under it, strike the lip or short lever-arm D′, and thus tilt its long arm D in an upward direction, which releases catch F from shoulder d, thus releasing ball m, which is clamped between the socketed catch F and studs E, when the hoisting-pulley L will drop down upon the load by its own weight and that of the fork. After the fork has been charged it is elevated by pulling on rope R until ball m, entering the bell-shaped mouth B in the bottom of the carriage, strikes and tilts catch F, the socket of which it enters, and is held therein between it and the studs E by lever D D′ falling back into its locking position; but before ball m reaches its socket, and while the load is being elevated from the wagon to the carrier, the latter is held in place upon the track-beam by block H abutting against the short end of lever D D′, as shown in Fig. 3, which it cannot pass until ball m, entering the socketed catch F, throws this and lever-arm D up sufficiently to dip arm D′, so that the carriage may pass under block H on its return trip to the mow. To shift this carriage from one mow to another at opposite ends of the track, all that is necessary is to run the carriage off the track at one end, reverse it, and then run it on again at the same end without any change in its parts.

Having thus described our improvement, we do not claim broadly the combination of the bail or frame of the fork-sheave with a hooked catch and a latch for interlocking or releasing the fork-sheave and the carriage, as we are aware that this combination has been used before in various forms; but

What we claim, and desire to secure by Letters Patent of the United States, is—

1. The carriage-frame composed of two halves, A and A′, united by bolts a a′, and cast with the lugs b and concavities b′, forming the bell-shaped mouth B, substantially as set forth.

2. The combination of the sheave-frame M, provided with the sheave L, and having the shank M′ and rigid ball m, with the carriage A A′, provided with the studs E, pivoted socket or catch F, bell-shaped mouth B, and lever composed of the weighted long arm D, having offset d and short arm D′, constructed and combined as and for the purpose herein shown and specified.

3. The combination of the track-beam T, having the triangular combined stop and trip-block H, of triangular shape, carriage A A′, provided with the studs E, pivoted socket or catch F, bell-shaped mouth B, and lever composed of the weighted long arm D, having offset d and short arm D′, and sheave-frame M, provided with the hoisting-sheave L, and having shank M′ and rigid ball m, the whole constructed and arranged to operate in the manner and for the purpose herein shown and described.

In testimony that we claim the foregoing as our own we have hereunto affixed our signatures in presence of two witnesses.

JOHN H. LUX.
PHILIP LUX.

Witnesses:
WM. V. CATTRON,
EDWARD WAGNER.